Sept. 25, 1956  P. E. ROBERTS  2,764,430
SWIVEL COUPLING FOR TUBING AND HOSE

Filed July 17, 1953

INVENTOR.
PAUL E. ROBERTS
BY
ATTORNEY

United States Patent Office 2,764,430
Patented Sept. 25, 1956

2,764,430

SWIVEL COUPLING FOR TUBING AND HOSE

Paul E. Roberts, Charlotte, Mich., assignor, by mesne assignments, to Maeward Couplings, Inc., Olivet, Mich., a corporation of Michigan Application July 17, 1953, Serial No. 368,609

3 Claims. (Cl. 285—247)

This application refers to coupling devices, and particularly to a coupling which may be of the reuseable type for interconnecting tubing and hose.

In previously known devices for coupling tubing and hose, there have been certain major disadvantages which have for a long time been well known to the industry. Among these difficulties was the necessity of using various types of fittings in association with the coupling mechanism for attaching same to the hose or to the tubing, the likelihood of twisting the hose during assembly which often resulted in a weakened or broken hose structure, and in the necessity of using a mandrel to assist in the assembly of the coupling structure with the hose. The use of a mandrel is not only inconvenient but renders impossible the assembly of a curved coupling device to the hose without unduly cutting or gauging the interior of said hose. Further, these coupling devices have usually been composed of many parts, often requiring complex machining and hence they have often been unduly expensive.

A principal object of the invention is to provide a device for connecting a pair of tubular members in communicating relationship with each other where one of said members is of relatively stiff material and the other is of relatively softer material.

A further object of the invention is to provide a coupling device for connecting a length of tubing to a length of hose.

A further object of the invention is to provide a device, as aforesaid, which can be applied directly to both the tubing and to the hose.

A further object of the invention is to provide a device, as aforesaid, which will permit relative rotation between the tubing and the hose.

A further object of the invention is to provide a device, as aforesaid, in which the tubing is thrust into the hose by the action of threaded means.

A further object of the invention is to provide a device, as aforesaid, which can be assembled without the necessity of using a mandrel.

A further object of the invention is to provide a device, as aforesaid, in which the tubing can be bent at a point close to the coupling and so bent prior to assembly thereof with the tubing.

A further object of the invention is to provide a device, as aforesaid, which is reuseable.

A further object of the invention is to provide a device, as aforesaid, which is of maximum simplicity.

A further object of the invention is to provide a device, as aforesaid, which will hold tubing and hose in coupled relationship and against leakage under pressures in excess of rated safety factors as specified by hose manufacturers.

A further object of the invention is to provide a coupling, as aforesaid, which will be adaptable to a wide range of low, medium and high pressure service, but which is particularly useful in high pressure applications, such as in excess of 500 p. s. i.

Other objects and purposes of the invention will be apparent to persons acquainted with devices of this general type upon a reading of the following specification and inspection of the accompanying drawings.

Figure 1:
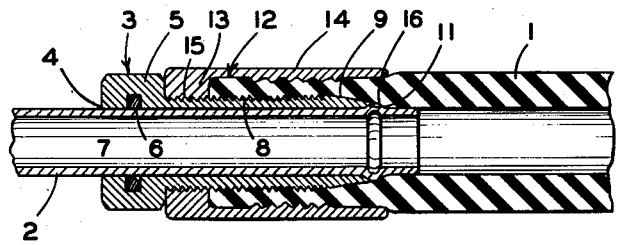
Figure 1 represents a central section of a length of tubing and a length of hose coupled together by the coupling of the invention.

For convenience in reference, but without any intention to limit, the following terminology will be empolyed: the term "leading" and the term "rightward" and derivatives of each thereof will refer to directions and positions toward the right of the device as appearing in any of the figures of the drawings. Similarly, the term "following" and the term "leftward," and derivatives of each thereof, will refer to positions or directions to the left as appearing in any of the figures of the drawing.

Referring to the drawings, there is indicated a hose 1 of any conventional flexible type, and a tubing 2 whose external diameter is substantially equal to the internal diameter of said hose. This is common in equipment for actuating hydraulic mechanism and needs no further detailing. The tubing will for present purposes be assumed to be of metal, but it will be recognized that other types of tubing, such as some kinds of plastic, may in some instances, be used advantageously and without departing from the scope of the present invention.

A body member 3 is provided with an internal opening 4 of such diameter with respect to the external diameter of the tubing that it will slip onto the tubing with sufficient clearance, but preferably only sufficient clearance, to be readily movable. For illustration, clearances of from 0.003–0.010 inch are typical for a tube of one half inch diameter. Said body part 3 is preferably provided with a nut section 5 having an external, non-circular cross-section, as hexagonal, for convenient application of a wrench in the usual manner. Within said body part there is in this embodiment provided an annular internal groove 6 for the reception of an O-ring 7. The dimensions of said groove 6, its shape, and the exact clearance between the internal surface of the body part 3 and the external diameter of the tubing 2 are all chosen in accordance with conventional O-ring practice which is well known to those skilled in the art and needs no detailing here. An externally threaded nipple 8 extends from the nut section 5 of the body part 3 toward and into the hose. The internal wall of said nipple is a continuation of the internal wall of the nut section 5. The extremity of said nipple is tapered as at 9 and it also has an undercut 11 as set forth in more detail hereinafter.

A shell 12 is of generally cup-shape having a bottom 13 with an opening 15 threadedly mounted on said nipple and having a skirt 14 extending toward said hose and coaxial with said nipple. The internal surfaces of said skirt may in some instances, if desired, be tapered, as is common in the art, to compress the hose between said nipple and said skirt as said nipple is advanced rightwardly with respect to said shell.

The rightward end of the tubing 2 is provided, preferably near its extremity, with an external projecting bearing member, here a bead, 16. Said bearing member may comprise the arc of a circle, as appearing in Figures 1, 1a and 2, or it may have a substantially conical rightward side as appearing in Figures 3, 4 and 5. Said bearing member extends a radial distance at least equal to, and in some instances greater than, the radius of the adjacent edge 10 of the nipple 8 for purposes appearing hereinafter. The undercut surface 11 of said nipple is shaped to conform to, and lie closely against, the leftward surface of said bead.

Operation

The body part 3 with the nipple carried thereby is slipped over the end of the tubing 2 and the bead 16 is formed thereon. Alternatively, where only one end of said tubing is to be beaded, said bead may be formed thereon and the body part with the O-ring in position slipped onto said tubing from the other end of the tubing. The shell is placed on the hose 1. The tubing with the bead 16 thereon is then introduced through the opening 15 in the shell and is urged manually into the interior of the hose sufficiently to engage the external threads of the nipple with the internal threads of the shell. When said threads are engaged, the body part 3 is then rotated with respect to the shell by any convenient means available and is thereby urged rightwardly with respect to said shell. Inasmuch as the rightward end of said nipple bears against the leftward end of the bead on said tubing, the rotation of said body part with respect to said shell, urges both of said nipple and said tubing rightwardly into said hose. Inasmuch as the bead 16 on the tubing acts as a spreader preceding the end 9 of the nipple, said nipple will move into the hose smoothly and without materially injuring the inner walls thereof and without the use of a separate mandrel. The O-ring will bear against the external surface of the tubing and seal same in the usual manner. By the time the nipple is fully extended into the hose and the body part 3 is tightened against the bottom 13 of the shell 12, the hose will be sufficiently gripped between the skirt 14 of said body part and the nipple that it will be held firmly in a manner already well known.

Although the O-ring will seal tightly the space between the body part and the tubing against the passage of liquid therebetween, it will not prevent rotation of the tubing with respect to the hose, which capacity will facilitate assembly and will prevent the twisting of the hose and consequent weakening or breakage thereof. Further, this rotational capacity will permit convenient positioning and alignment in installation and allow swiveling in operation.

Modifications

Figure 2:
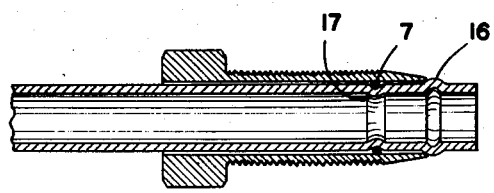
Figure 2 is a similar section of a modification thereof.

In the form of the invention shown in Figure 2, the groove 6 for the O-ring is omitted and its function is performed by the internal bead 17 provided in the tubing and spaced a relatively short distance from the rightward end of the tubing. The O-ring is then received into the groove provided by said bead and bears against the internal surface of the nipple 8.

Figure 1A:
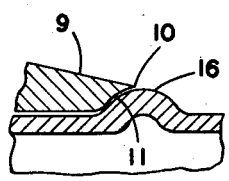
Figure 1a is an enlargement of a portion of Figure 1.

The assembly and functioning of this device is the same as above described with respect to Figure 1 excepting only that here the O-ring may be replaced. This is accomplished by removal of the hose and backing of the body part leftwardly sufficiently to uncover the O-ring and its retaining groove. This form has the disadvantage of slightly restricting fluid flow through the tubing by reason of the internal extension of the beading 17, but it has the advantage of permitting replacement of the O-ring without complete disassembly of the parts, as is required in connection with the device shown in Figure 1.

Figure 3:
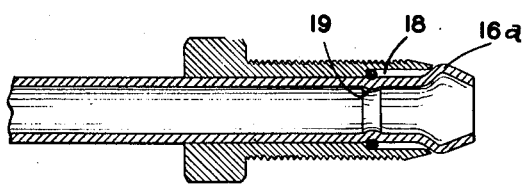
Figure 3 is a similar section of a further modification thereof.

Figure 3 shows a modification having two additional features. The first is the conical forming of the externally positioned bead 16a which in some instances may make for slightly smoother leading into a hose than would be obtained with the other forms shown. The modification of this figure also permits, by the provision of a counterbore 18 and the partial reception of the O-ring into the counterbore, the provision of a substantially smaller internal bead 19 than is required by the form shown in Figure 2. In this manner, the advantages of retracting the body part for replacing the O-ring are secured as effectively as in the form shown in Figure 2 but the disadvantage, if any, of the internally extended bead 17 is materially reduced.

Figure 4:
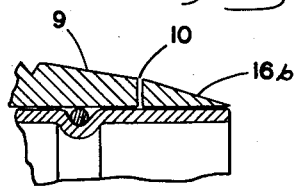
Figure 4 shows a further modification.

In some instances where it is desirable that the leading end of the body part nipple bear squarely against the following side of the bearing member 16, it may be preferable, particularly in larger installations, to provide said bearing member 16b as shown in Figure 4 by brazing a suitably shaped ring around the rightward end of said tube which ring has its leading side of substantially conical shape and its following side defining a plane perpendicular to the axis of said tube. Thus, with the leading side of the body part nipple similarly defining a plane perpendicular to the axis of the body part, said parts will firmly engage in bearing relation.

Figure 5:
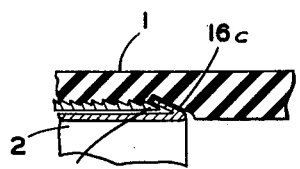
Figure 5 shows a still further modification.

In the form shown in Figure 5, the bearing member 16c is formed, together with a leading slope, by upsetting the walls of tubing as shown. Also, in this figure the inside diameter of the tubing is shown as equal to the inside diameter of the hose.

While a coupling of the reuseable type has been here employed to illustrate the invention, it will be recognized that many of the purposes of the invention may be attained in a coupling of the pressed-on type. In such case, the shell bottom 13 is made integral with the body member 3; the shell and associated body member are slipped over the end of the hose and the shell then compressed to hold the device in place.

While the use of an O-ring has been assumed throughout the foregoing description, and is preferable in most cases, it is not always necessary and may sometimes be omitted without departing from the broader aspects of the invention.

While particular embodiments of the invention have been selected for illustrative purposes, it will be recognized that many forms of the invention will be immediately apparent to persons acquainted with devices of this general type and that accordingly the scope of the hereinafter appended claims is to be taken as including such variations excepting as said claims may by their own terms expressly require otherwise.

I claim:

1. In a coupling device for connecting a flexible hose and a substantially rigid tubing, wherein the external diameter of said tubing is substantially equal to the internal diameter of said hose and one end of said tubing is intended to be received within said hose, the combination comprising: a radially outwardly extending bearing member comprised of a bead on said tubing, said bead being spaced from said one end of said tubing, said tubing being of substantially the same size on either side of said bead; a body member rotatably mounted on said tube, said body member having an externally threaded nipple extending therefrom surrounding said tubing, the end of said nipple engaging said bearing member and having external diameter not substantially greater than the maximum diameter of said bearing member; and a shell threadedly supported on said body member and having a portion radially spaced from at least a major portion of said nipple and adapted to clamp the hose to said nipple.

2. The combination of claim 1, including means defining an annular groove between said body part and said tubing; and an O-ring within said groove contacting said tubing.

3. The combination of claim 1 wherein said nipple tapers toward said bead and has a leading edge of substantially the same shape as the following side of said bead.

References Cited in the file of this patent

UNITED STATES PATENTS

| 2,450,581 | Couty | Oct. 5, 1948 |
| 2,476,480 | Burckle | July 19, 1949 |
| 2,627,580 | Picard | Feb. 3, 1953 |